US009441486B2

(12) United States Patent
Davey

(10) Patent No.: US 9,441,486 B2
(45) Date of Patent: Sep. 13, 2016

(54) CENTRIFUGAL COMPRESSOR

(75) Inventor: Garth Davey, Sommerville (AU)

(73) Assignee: AMBER POWER PTY LTD (AU)

( * ) Notice: Subject to any disclaimer, the term of this patent is extended or adjusted under 35 U.S.C. 154(b) by 171 days.

(21) Appl. No.: 13/635,354

(22) PCT Filed: Mar. 17, 2011

(86) PCT No.: PCT/AU2011/000294
§ 371 (c)(1),
(2), (4) Date: Nov. 19, 2012

(87) PCT Pub. No.: WO2011/113098
PCT Pub. Date: Sep. 22, 2011

(65) Prior Publication Data
US 2013/0219893 A1     Aug. 29, 2013

(30) Foreign Application Priority Data

Mar. 17, 2010  (AU) ................ 2010901115

(51) Int. Cl.
| F04D 29/44 | (2006.01) |
| F04D 25/02 | (2006.01) |
| F04D 13/04 | (2006.01) |
| F04B 47/04 | (2006.01) |
| F01D 1/02 | (2006.01) |
| F01D 1/22 | (2006.01) |
| F01D 15/08 | (2006.01) |
| F01D 15/12 | (2006.01) |
| F04D 25/04 | (2006.01) |
| F04D 29/26 | (2006.01) |

(52) U.S. Cl.
CPC . *F01D 1/02* (2013.01); *F01D 1/22* (2013.01); *F01D 15/08* (2013.01); *F01D 15/12* (2013.01); *F04B 47/04* (2013.01); *F04D 13/04* (2013.01); *F04D 25/02* (2013.01); *F04D 25/04* (2013.01); *F04D 29/266* (2013.01); *F04D 29/442* (2013.01); *F04D 29/447* (2013.01); *F05D 2260/40311* (2013.01)

(58) Field of Classification Search
CPC .... F04D 29/442; F04D 25/02; F04D 29/447; F04D 13/04; F04B 47/04
USPC ....... 417/323, 355, 374, 375, 377, 379, 405; 60/670, 671, 651
See application file for complete search history.

(56) References Cited

U.S. PATENT DOCUMENTS

| 1,979,393 | A | * | 11/1934 | Marguerre | ............... 60/652 |
| 2,321,276 | A | * | 6/1943 | De Bolt | ............... 417/323 |
| 3,868,196 | A | | 2/1975 | Lown | |
| 5,133,190 | A | * | 7/1992 | Abdelmalek | ............... 60/648 |
| 6,629,413 | B1 | * | 10/2003 | Wendt et al. | ............... 60/655 |
| 6,782,703 | B2 | * | 8/2004 | Dovali-Solis | ............... 60/785 |
| 7,703,283 | B2 | * | 4/2010 | Barker | ............... 60/608 |
| 2005/0056001 | A1 | | 3/2005 | Frutschi et al. | |

FOREIGN PATENT DOCUMENTS

| GB | 1057169 | 2/1967 |
| JP | 11-270346 | 5/1999 |

* cited by examiner

*Primary Examiner* — Audrey K Bradley
*Assistant Examiner* — Wesley Harris
(74) *Attorney, Agent, or Firm* — George C. Rondeau, Jr.; Davis Wright Tremaine LLP

(57) ABSTRACT

A centrifugal compressor comprising an impeller having an input drive, the impeller having an impulse turbine positioned around the periphery of the impeller to be driven by the gas exiting the impeller, the output of the turbine being coupled to the drive of the impeller.

13 Claims, 12 Drawing Sheets

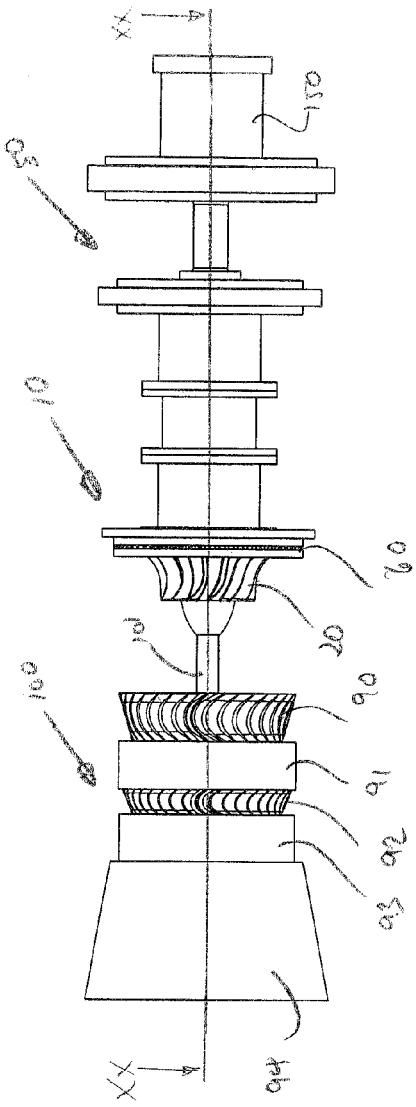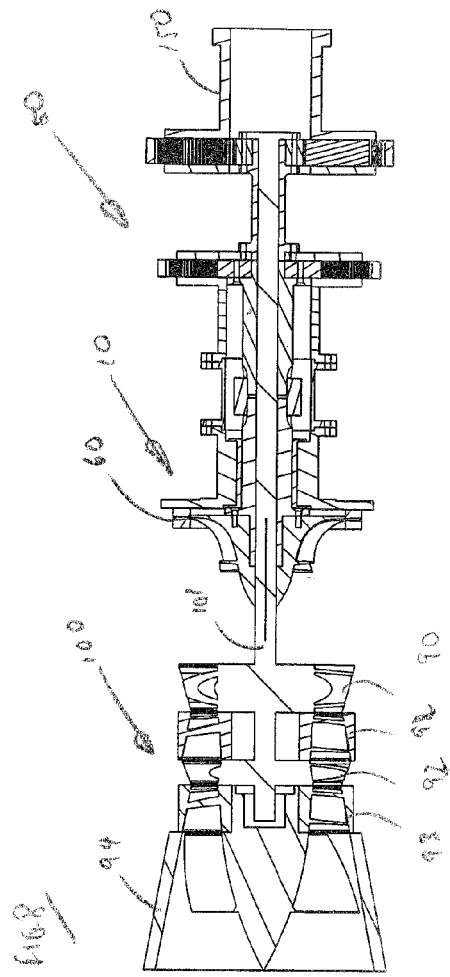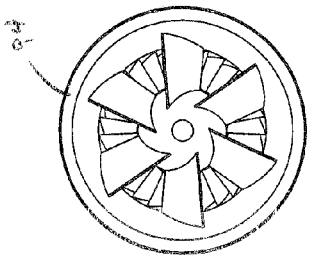
FIG 6
FIG 8
FIG 7

CENTRIFUGAL COMPRESSOR

INTRODUCTION

This invention relates to a centrifugal compressor.

BACKGROUND OF THE INVENTION

Centrifugal compressors operate through use of an impeller rotating at high speed with the centrifugal force causing the gas to be compressed. In compressors of this type, the gas exits the impeller at very high velocity. As this gas slows down the energy is converted into heat thus causing the temperatures at small distances from the tips of the impeller to rise to significant temperatures. This heat is usually lost to atmosphere and thus reduces the overall efficiency of the compressor.

It is these issues that brought about the present invention.

SUMMARY OF THE INVENTION

According to once aspect of the present invention there is provided a centrifugal compressor comprising an impeller having an input drive, the impeller having an impulse turbine positioned around the periphery of the impeller to be driven by the gas exiting the impeller, the output of the turbine being coupled to the drive of the impeller.

Preferably, a stator is positioned between the exit of the impeller and the turbine to redirect exeunt gas.

In a preferred embodiment, a double planetary gearbox is utilised to drive the impeller.

DESCRIPTION OF THE DRAWINGS

An embodiment of the present invention will now be described by way of example only with reference to the accompanying drawings in which:

FIG. 6 is a side elevational view of an assembly of the centrifugal compressor in conjunction with a two stage turbine with casings removed, FIG. 7 is an end elevational view of the assembly, FIG. 8 is a cross sectional view of the assembly taken along the lines X-X of FIG. 6.

DESCRIPTION OF THE PREFERRED EMBODIMENTS

Figure 1:
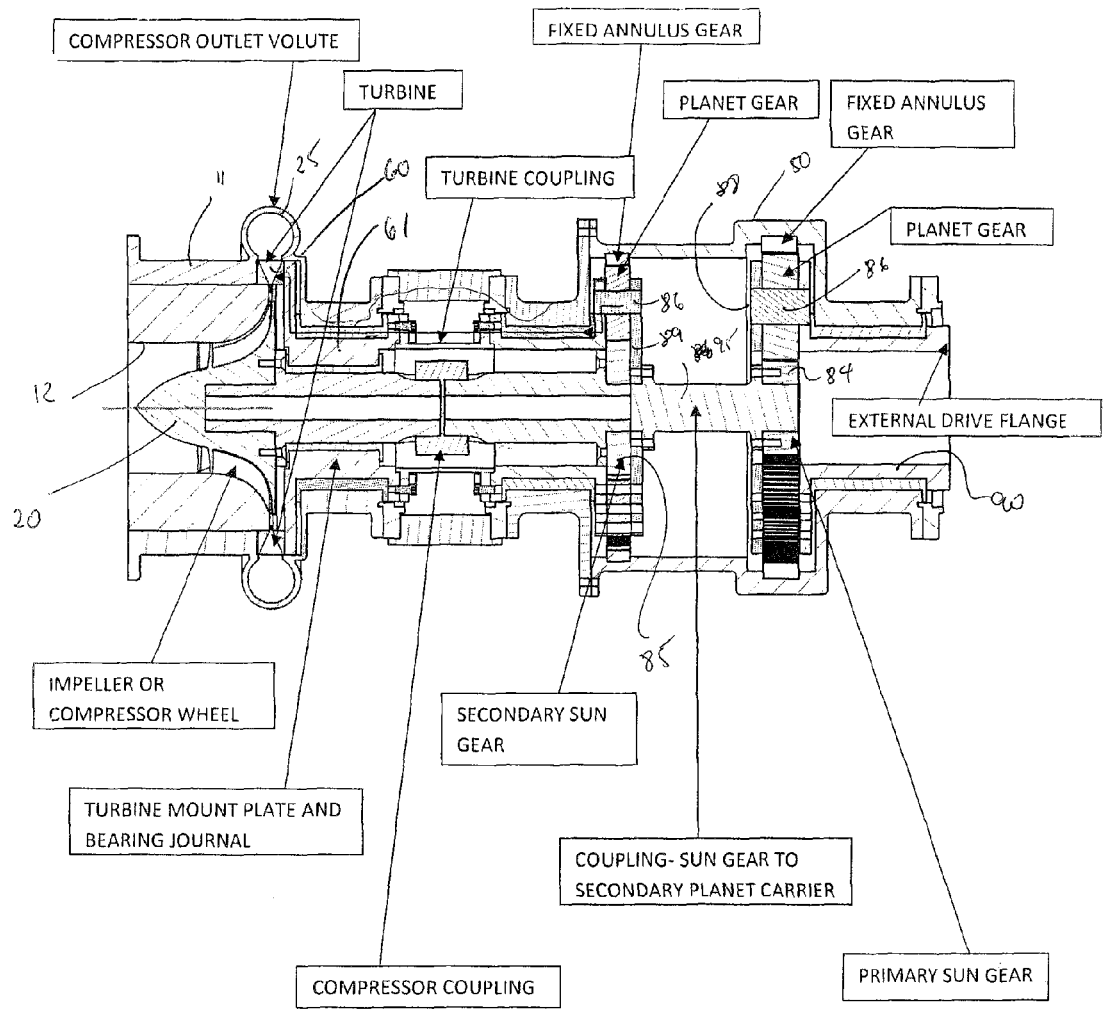
FIG. 1 is a cross-sectional view of an embodiment of a centrifugal compressor.
Figure 2:
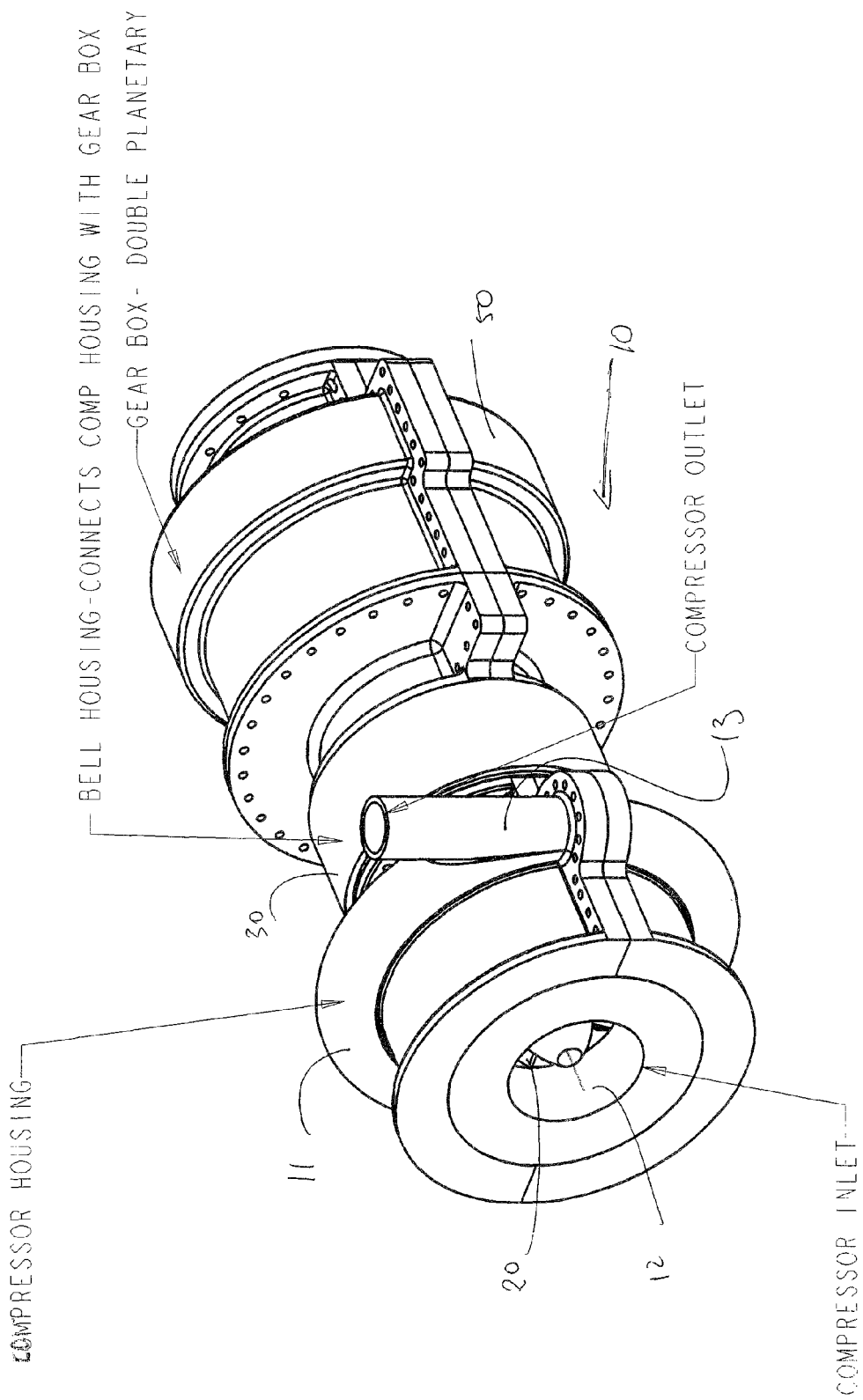
FIG. 2 is an external perspective view of the compressor.
Figure 3:
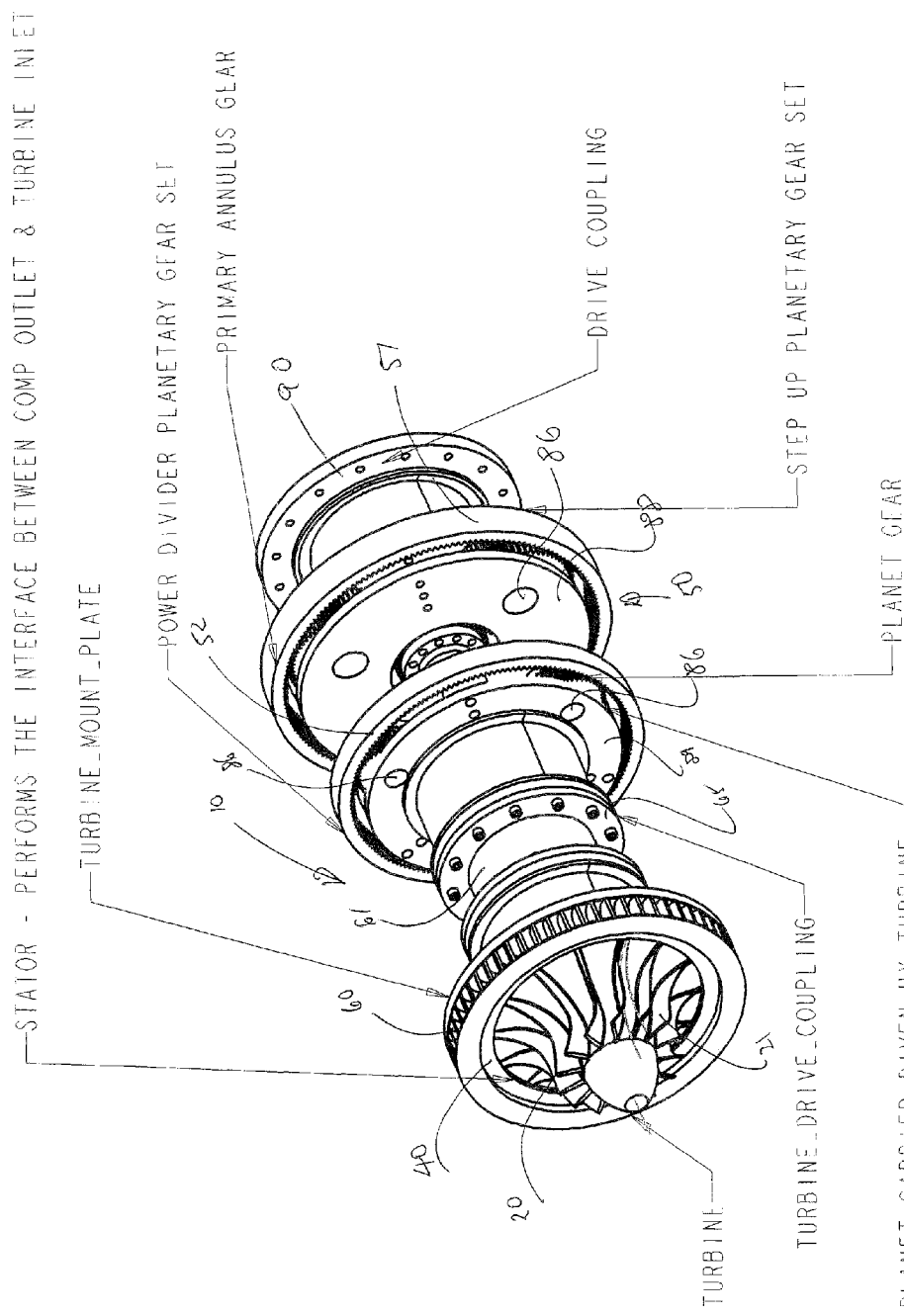
FIG. 3 is a perspective view of the interior of the compressor.

As shown in FIGS. 1 to 3, a compressor 10 comprises a compressor housing 11 with a central gas inlet 12 and a tangential outlet 13. The compressor includes a bladed impeller 20 which is driven through a double planetary gearbox 50. A bell housing 30 connects the gearbox 50 to the compressor housing 11. The external view of these components is shown in FIG. 2 and FIG. 3 shows the same components in perspective view with the covers removed. FIG. 3 illustrates that the periphery of the impeller vanes communicates with a stator 40 which in turn redirects the exeunt gases to an impulse turbine 60 that is mounted on the exterior of the compressor. The impulse turbine has an output drive coupling 65 that feeds power into the planetary gearbox 50 to assist the drive to the compressor impeller 20.

Figure 4:
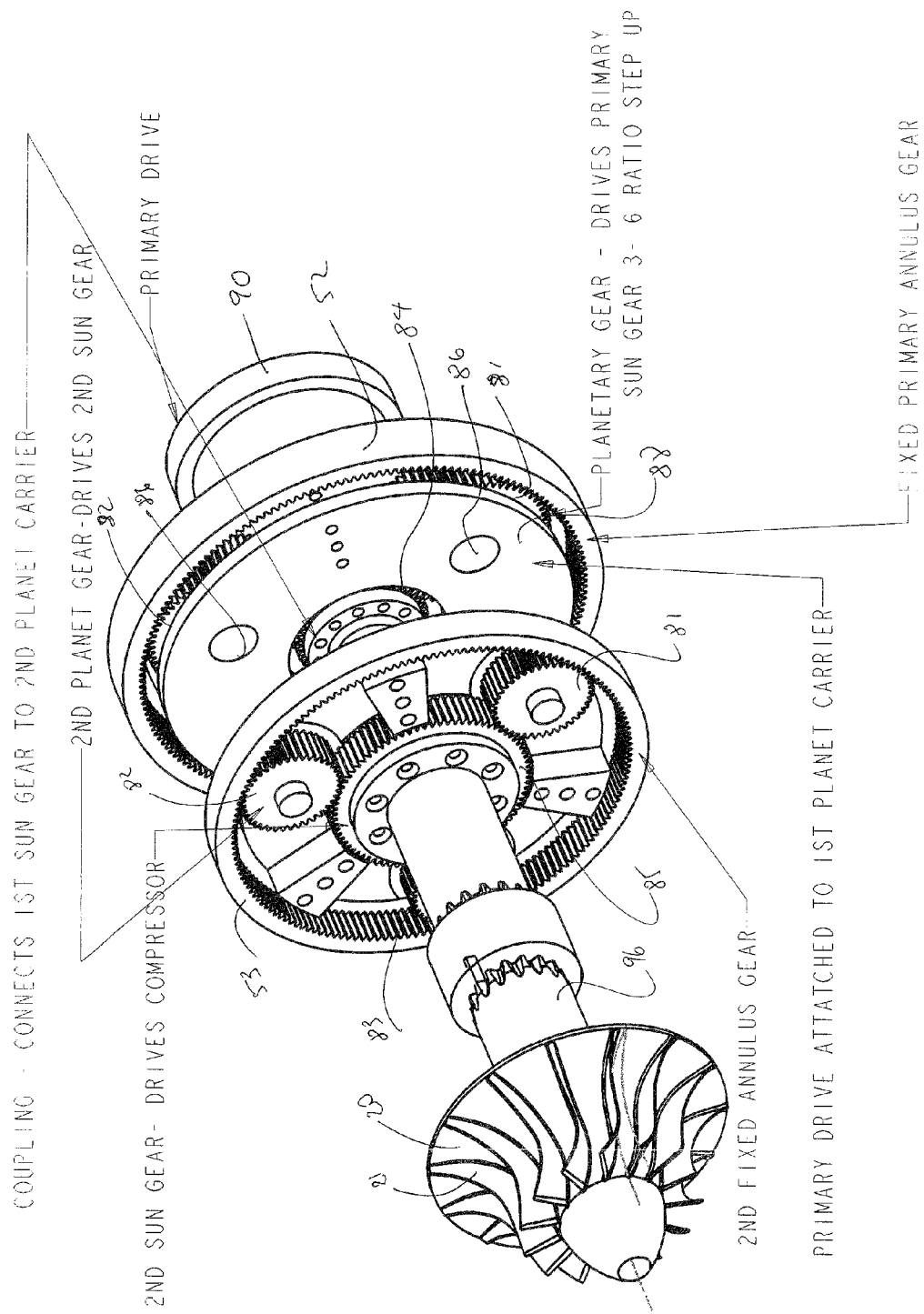
FIG. 4 is a perspective view illustrating a compressor drive line.
Figure 5:
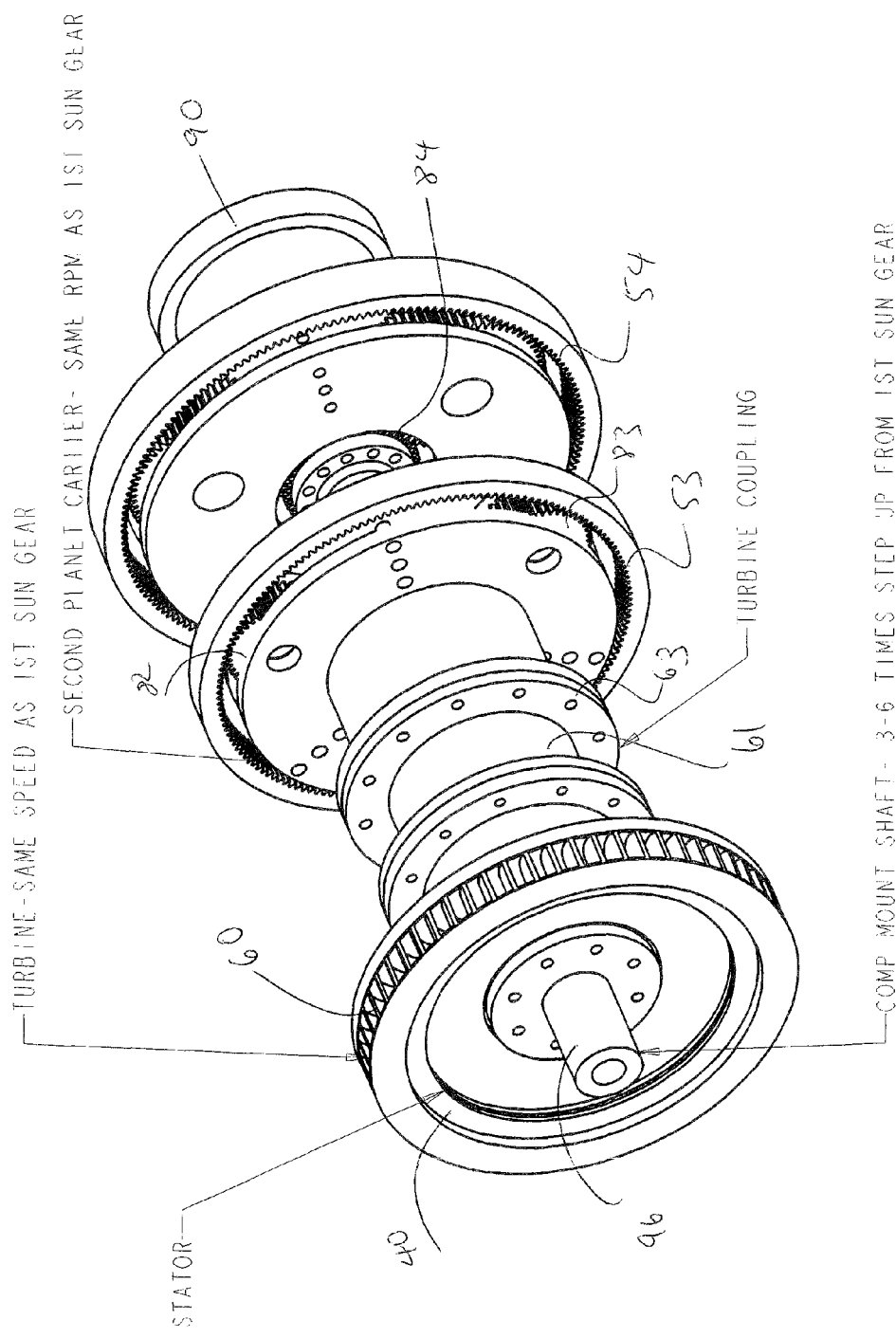
FIG. 5 is a perspective view illustrating a turbine drive line.

The detail of the drive to the compressor 10 and the turbine's relationship with the compressor and drive back to the planetary gearbox is shown in greater detail in FIG. 1 which is a cross-sectional view of the compressor 10 and FIGS. 4 and 5 which are, respectively, perspective illustrations of the compressor drive line and the turbine drive line.

It is known that as gas exits the impeller 20 in a centrifugal compressor it is at very high velocity. The deceleration of these gases causes a sharp increase in temperature with exit temperatures often reaching 300° C. This heat is usually lost to the atmosphere or through a cooler and thus reduces the overall efficiency of the compressor. The aim of this invention is to harness the exit velocity to drive an impulse turbine 60 to ensure that the exit gases are kept to the lowest possible temperature whilst maintaining the pressure so the compressor can carry out its duty as a compressor. The turbine extracts the energy in the high velocity exeunt gases before they have a chance to be converted to heat in the deceleration phase.

To this end, the stator 40 is positioned adjacent the exit volute 25 of the compressor 10 to redirect the exeunt gases which are then fed to the impulse turbine 60 that is mounted peripherally around the exterior of the compressor. The impulse turbine 60 has an output shaft 61 that is then fed to the double planetary gearbox 50 of the compressor so that the energy generated by the turbine 60 is used to assist in the drive of the compressor 10. The gas exit of the turbine 60 becomes, in effect, the exit of the compressor, the gases exiting at the desired high pressure and a low working temperature of about 60% less than normal. The efficiency is increased by reducing the heat loss.

As shown in FIG. 1, the gearbox comprises a housing which supports a pair of co-axially spaced fixed annular gears 52, 53 each of which mesh with three equally spaced planetary gears 81, 82, 83 that mesh with a central sun gear 84 or 85. The planetary gears 81, 82, 83 of the first annular gear 51 are mounted on shafts 86 journalled to a first carrier 88 and the planetary gears of the second annular gear 52 are mounted on shafts 86 journalled to a second carrier 89. The sun gear 84 which is mounted on a shaft 95 that drives the carrier of the second set of planetary gears 81, 82, 83. The planetary gears 81, 82, 83 of the primary gear 51 are driven by a hollow drive shaft 90 that is externally driven. The secondary gear 85 is driven by the planetary gears 81, 82, 83 and is coupled to the main drive shaft 96 that extends through the bell housing and has the impeller 20 mounted thereon.

The impeller 20 rotates at high speed within a casing that defines the outlet volute 25. The air is drawn through the central aperture 21 in the front of the compressor and is compressed centrifugally as the impeller 20 rotates at high speed to be ejected from the compressor outlet volute 25. The outlet volute has its exit height reduced in size by about two thirds to further increase the output velocity and reduce outlet temperature.

The turbine 60 is an impulse turbine that comprises a stator 40 positioned adjacent the tips of the impeller blades 21 to redirect the direction of gas flow to a series of turbine blades that are mounted on a hollow output shaft 61.

The secondary planetary gear carrier 89 is driven by the outlet shaft 61 of the turbine 60 so that the outlet shaft drives the three equally positioned planetary gears 81, 82, 83 about the fixed annular gear 53, the planetary gears drive the central sun gear 85 which is mounted on the main drive shaft 96 to drive the impeller 20. The output shaft 61 of the turbine 60 runs co-axially with the input shaft 96 of the compressor and runs separately to be coupled to an annular coupling 63 that in turn drives the planetary gear carrier 89 of the secondary gear set.

The turbine blades are within the compressor outlet volute 25 and thus the compressed gases, after leaving the turbine, are exhausted through the compressor outlet 13. The compressor 10 is particularly useful in compressing nitrogen gas to liquid and operates with a compression ration of between 6-10:1. The planetary gearbox has a ratio of between 3-7:1 and the outlet gas temperature is significantly lower than normal. The sun gear 85 of the secondary gear set is overdriven by the turbine output to thus provide assistance to the input drive 96 of the compressor. The adjustability of the gearing ratios of the planetary gear sets ensure the correct ratio between the turbine 60 and the impeller 20 which is maintained at a fixed ratio. The turbine 60 is designed to travel at a much reduced speed in comparison with the impeller 20 so that the decelerating exit gases from the impeller drive the turbine.

It is understood that, between the drive of the compressor which could be an electric, petrol or diesel motor, a primary planetary gear set may also be introduced to ensure compatibility with conventional drive motors and provide the high speed required by the impeller.

Figure 9:
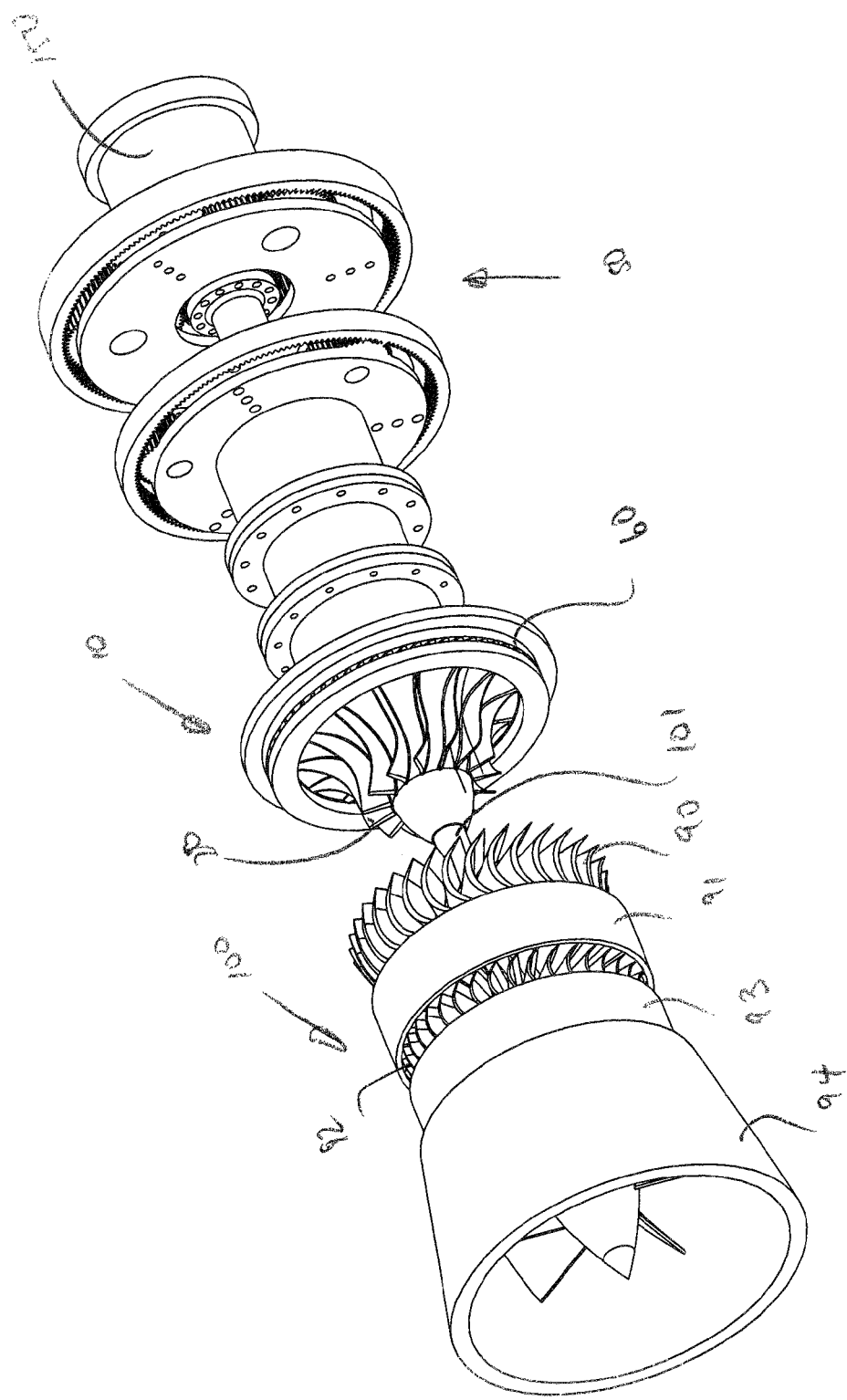
FIG. 9 is a perspective view of the assembly from one end.
Figure 10:
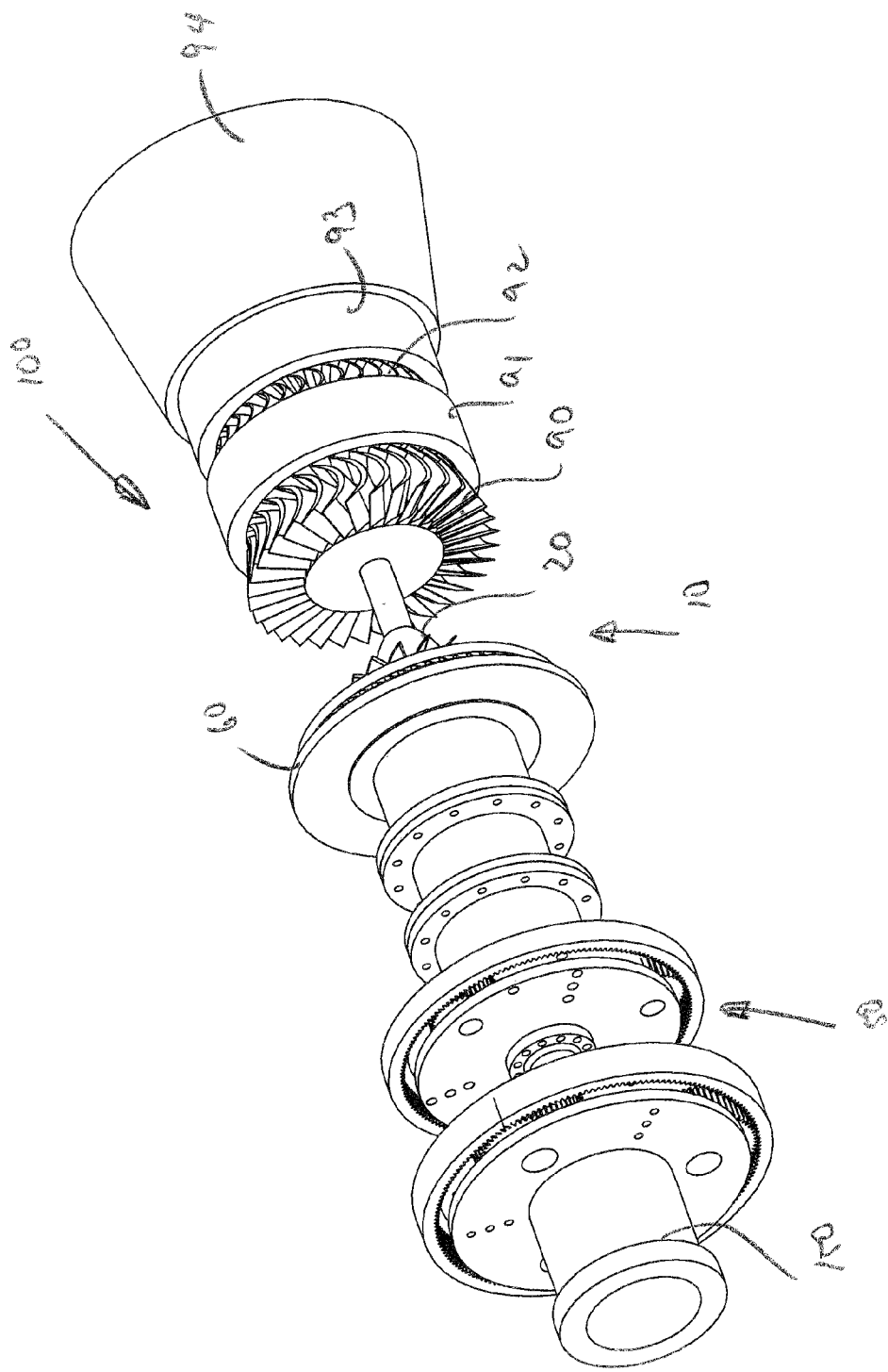
FIG. 10 is a perspective view of the assembly from the other end.

In a second embodiment the centrifugal compressor 10, that is the compressor in association with impulse turbine 60, is coupled to a two stage main turbine 100 to define a drive assembly (unit) as shown in FIGS. 6 to 10 where most of the outer casing has been removed. The two stage main turbine 100 comprises a first turbine rotor 90 that is adjacent to a stator 91 to a second turbine rotor 92 adjacent to a second stator 93. The gas exit of the main turbine is through a cowling 94. The output shaft 101 of the turbine 100 goes through the centre of the centrifugal compressor 10 and impulse turbine 60 to the main output shaft 150. The shaft 101 drives the impellor 20 of the compressor 10. The planetary gearbox 50 described with reference to the first embodiment is utilised to ensure that the drive from the impulse turbine shaft and main turbine shaft were all fed to the main output shaft 150 whilst also driving the compressor. FIG. 6 shows the drive unit in side elevation and; FIG. 7 is an end elevation view of the unit. FIG. 8 is a cross sectional view showing the drive unit and in particular the planetary gearbox 50. FIGS. 9 and 10 are isometric views of the unit from opposite ends.

The drive unit that is constituted by the combination of the main turbine 100, centrifugal compressor 10 and impulse turbine 60 can be used in a variety of ways which are described with reference to the embodiments shown in FIGS. 11, 12, and 13 and 14.

The generation of electricity is frequently carried out through the use of steam turbines operating a closed cycle or less frequently, by an open cycle gas turbine. The efficiency of these turbines is traditionally low and power stations expel heat and carbon dioxide into the atmosphere through cooling towers and exhaust chimneys.

Figure 11:
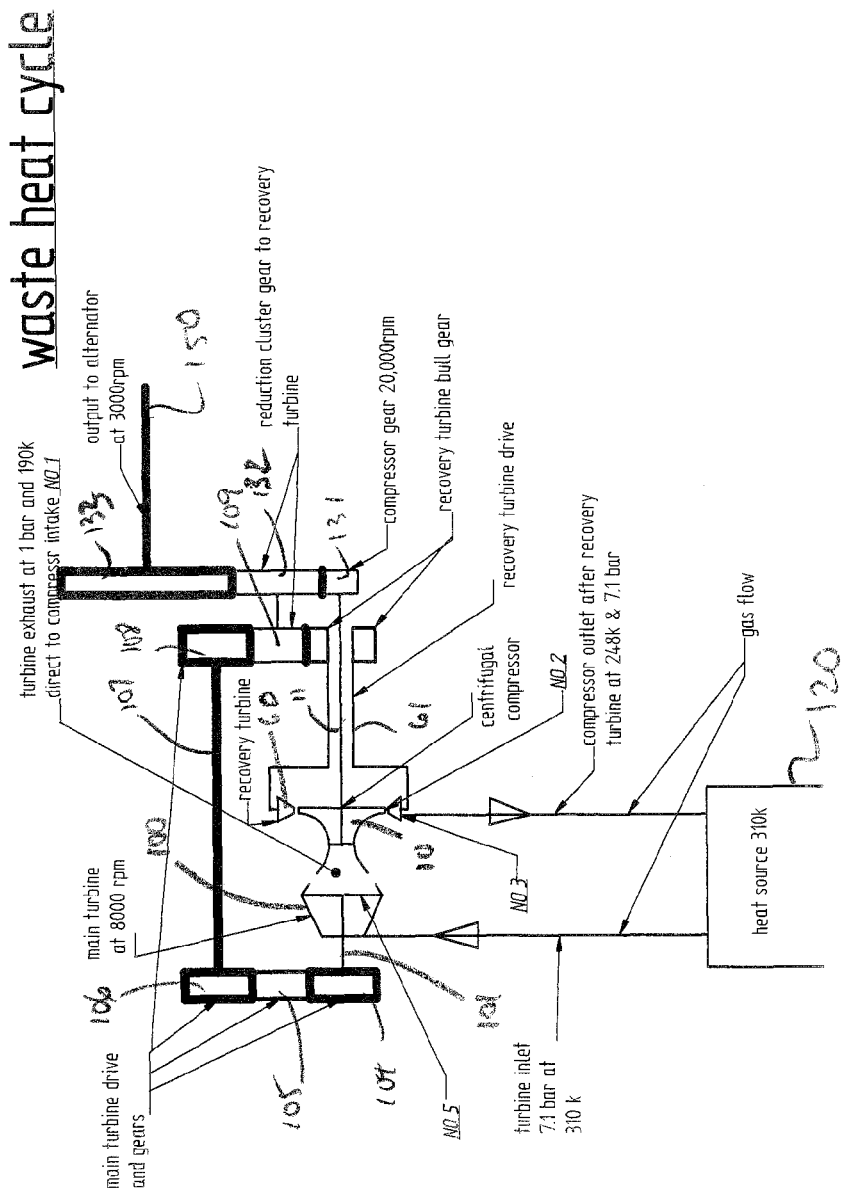
FIG. 11 is a schematic circuit illustrating a low temperature use of the turbine and compressor assembly.

In one embodiment the drive unit is illustrated in a schematic circuit diagram FIG. 11 for use in the generation of electricity. The main turbine 100 is directly coupled to the centrifugal compressor 10 so that the gas output of the turbine feeds the centrifugal compressor 10. The working gas is air. The impulse or recovery turbine 60 is mounted adjacent the periphery of the impeller vanes of the centrifugal compressor as described in the embodiment of FIGS. 1 to 5 and the gas output of the impulse turbine 60 is fed through a heat exchanger 120. The geared interconnection of the output shafts of the turbines and the input shaft of the compressor is shown schematically. The output shaft 101 of the main turbine 100 and the output shaft 61 of the impulse (recovery) turbine 60 and input shaft 11 of the compressor 10 are all geared to drive the main output shaft 150 which in turn drives an alternator (not shown) to generate electricity. The output shaft 101 of the main turbine is driven through a series of gears 104, 105, 106, through a shaft 107 to another gear 108 that meshes with a gear 109 that is in turn drives the step down gears 131, 132, 133 that drives the alternator to generate electricity. The input shaft 11 of the centrifugal compressor 10 is also driven through the step up gearbox to the alternator through the gear 131. The output 61 of the recovery turbine 60 also drives gear 109. In this manner, the alternator is driven by the output of the main turbine 100, and the output of the recovery turbine 60 that is associated with the centrifugal compressor 10.

The drive unit shown in FIG. 11 can be used with a source of heat at temperatures of about 310° K. More specifically it is designed to be used in conjunction with an electricity generating plant using a closed cycle steam turbine. The heat source is obtained after the condenser and before the cooling towers of the plant. In this embodiment the output of the steam turbine's condenser (not shown) is fed to the heat exchanger 120, to ensure that the heat exchanger operates at a temperature of 310° K. The heat exchanger 120 operates at temperatures of 310° K and the gas output from the heat exchanger is fed through the turbine 100 at a pressure of 7.1 bar at that temperature. The main turbine 100 operates at 8,000 rpm. The gas output of the turbine 100 then feeds the centrifugal compressor 10 at a pressure of 1 bar and a temperature of 180° K. The gas output of the compressor 10 after the recovery turbine 60 which is returned to the heat exchanger 120 is at a pressure of 7.1 bar and a temperature of 248° K. The mechanical drive of the compressor is a high speed shaft 11 running at 20,000 rpm, the reduction gearbox 130 reduces that speed to the drive 150 to the alternator which is set at 3,000 rpm.

The system described above with reference to FIG. 11 uses the heat from the steam turbine condenser to heat the exit gas of the recovery turbine 60 associated with the compressor 10. The system described above, is simply powered by the heat coming from the turbine's condenser which would otherwise be simply lost in power station cooling towers.

Figure 12:
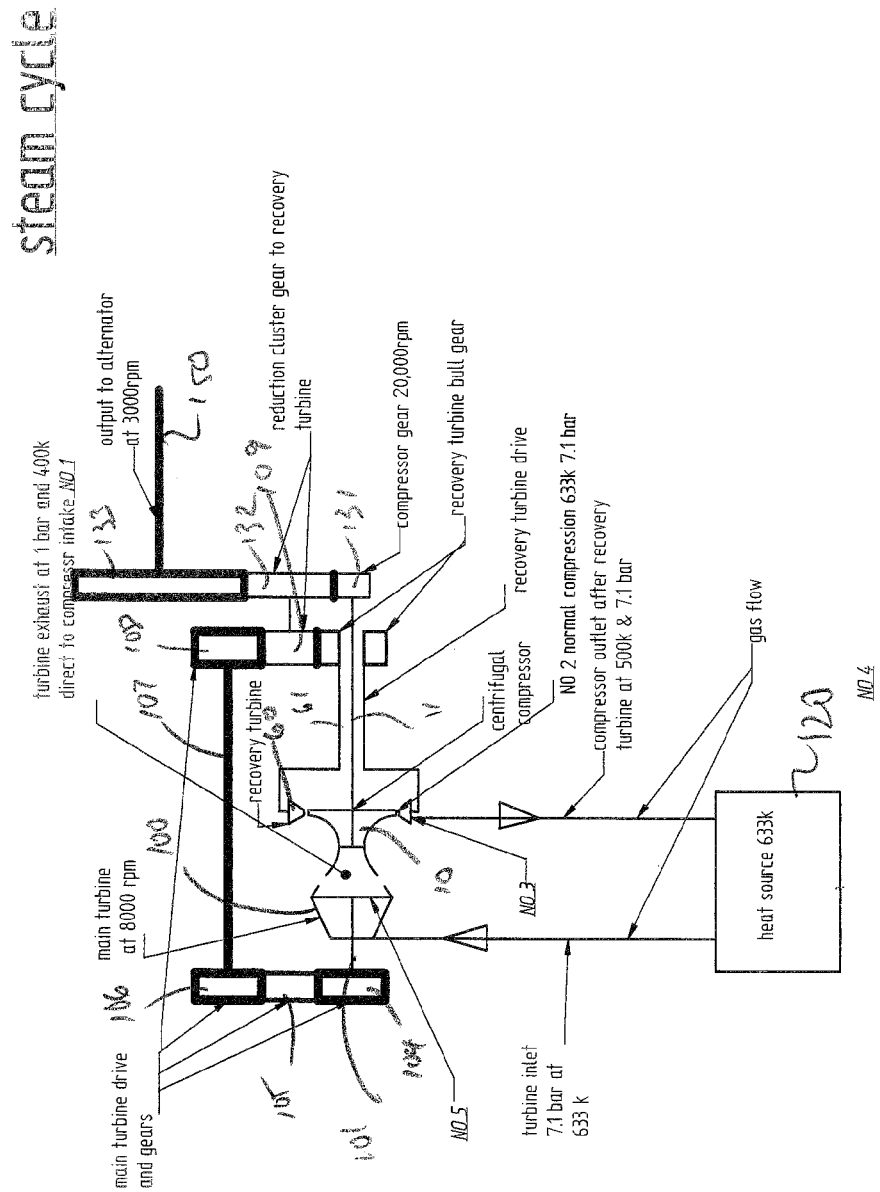
FIG. 12 is a schematic circuit illustrating use of the turbine and compressor assembly with a steam turbine.

In another embodiment shown in FIG. 12 the same system can also be used to generate electricity using a steam turbine 100. The unit effectively replaces the conventional use of a condenser and feed pump in a steam turbine closed cycle.

In this embodiment the heat exchanger 120 is in the form of an externally fuelled boiler. The cycle starts with steam at 1 bar and 400 k. The steam has an enthalpy at this point in time of 2730 kj/kg. The steam is then compressed with a pressure ratio of approximately 6, well within the capabilities of a single stage centrifugal compressor. This step will raise the pressure to 7.1 bar and its temperature would normally be 633 k, with an enthalpy of 3185 kj/kg. By recovering the energy from the high velocity gas exiting the compressor impeller 60% of the input energy required by the compressor can be recouped. This reduces the enthalpy to 2885 kj/kg and a temperature of 491 k.

|   | Temperature (K) | Pressure (MPa) | Density (kg/m³) | Enthalpy (kJ/kg) | Entropy (kJ/kg-K) |
|---|---|---|---|---|---|
| 1) | 399.99 | 0.10000 | 0.54761 | 2730.4 | 7.5025 |
| Before expansion at cycle start | | | | | |
| 2) | 633.54 | 0.71000 | 2.4571 | 3185.7 | 7.5025 |
| Normal compression enthalpy increase of 455.3 kj/kg | | | | | |
| 3) | 503.82 | 0.71000 | 3.1462 | 2912.2 | 7.0192 |
| After application of the recovery turbine | | | | | |
| 4) | 633.54 | 0.71000 | 2.4571 | 3185.7 | 7.5025 |
| After application of external heat | | | | | |
| 5) | 399.99 | 0.10000 | 0.54761 | 2730.4 | 7.5025 |

After expansion through a turbine

Recovery turbine 60 reduces compression enthalpy by 60% so that the enthalpy rise is now 182.12 kj/kg a difference of 273.18 kj/kg.

In the heat exchanger 120 the steam temperature can be raised to 633 k and expanded through the main turbine 100 which will drop the temperature back to 400 k ready for recompression. The energy output of the main turbine 100 is the same as the original energy required by the compressor without the recovery turbine 60, and so the unit output equals that recovered by the recovery turbine 60. In practice, some 15 to 20% will be lost in efficiency losses, giving a final output of 218.5 kj/kg.

The steam turbine cycle of FIG. 12 could also be used in association with a gas turbine. In this case the boiler is replaced by the exhaust of the gas turbine to heat the heat exchanger 120.

Multi stage compression using the same system of compression and recovery can raise the temperatures and pressures to far higher outputs so that a normal pressure and temperature for steam turbines is reached. As current technology for steam turbines can see efficiencies as high as 92% or better, the overall outcome could be as high as 80%.

Figure 13:
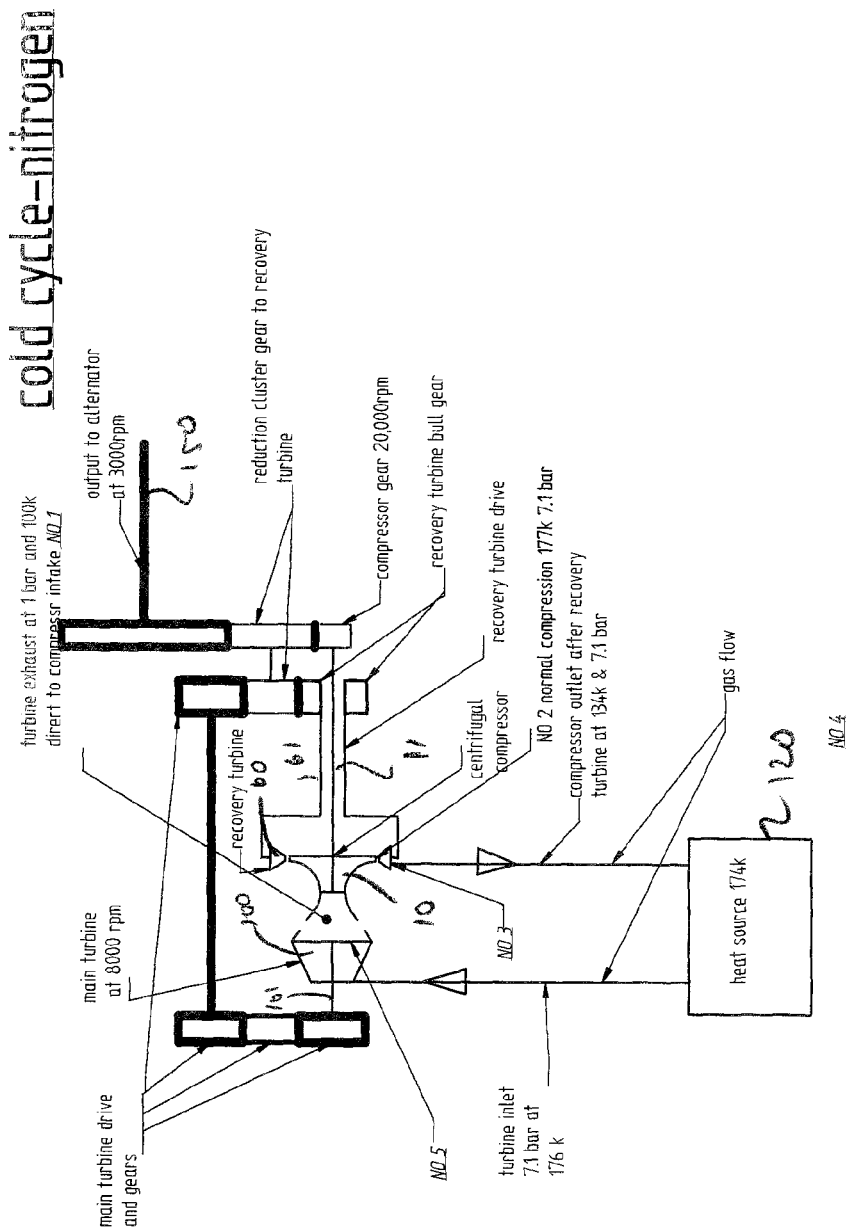
FIGS. 13 and 14 are schematic circuits of a cold use of the turbine and compressor assembly to liquefy a gas.
Figure 14:
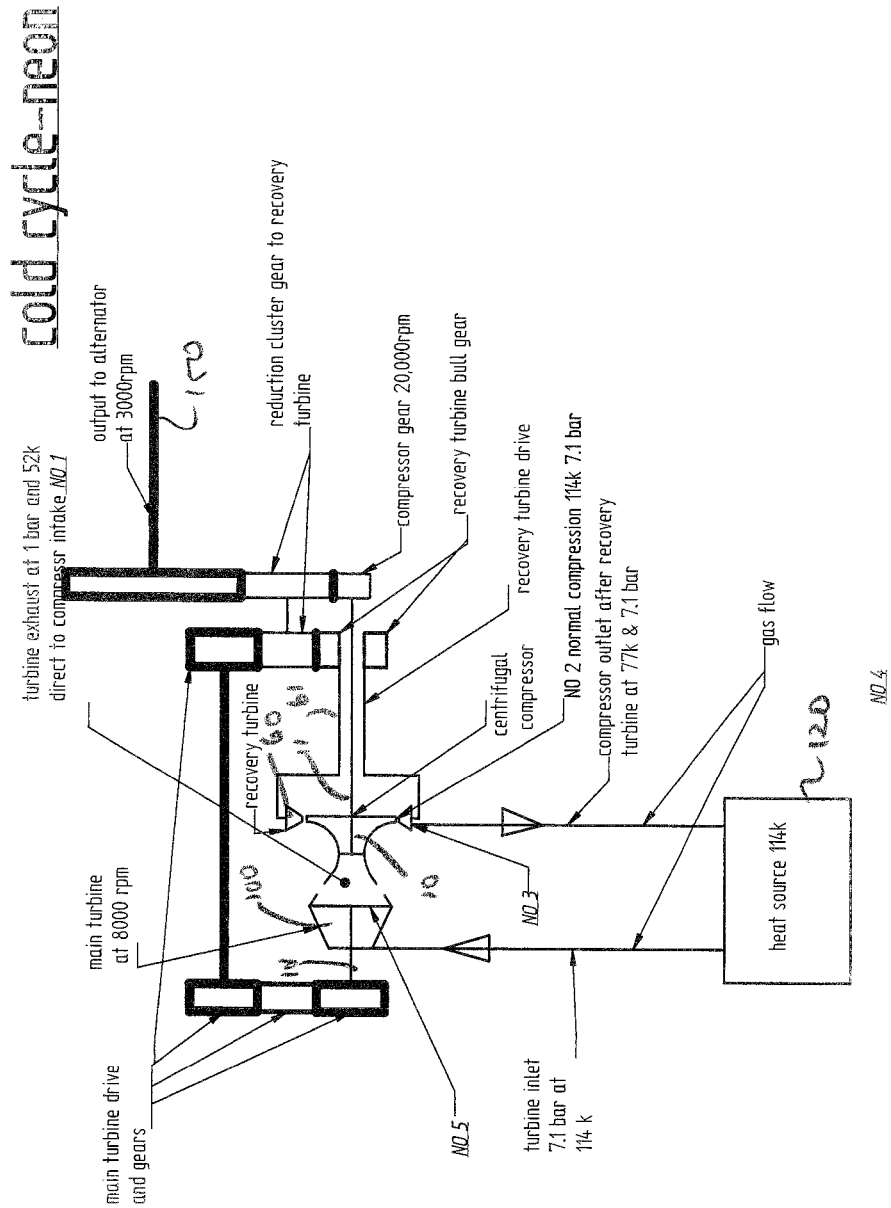

In the same principle, instead of using the energy from the latent heat of steam through a heat exchanger or condenser, the latent heat of a condensing gas can be used in a heat exchanger to generate electricity in a turbine/compressor unit of the kind described above. The schematic cycles using both nitrogen and neon as the working gas is shown in FIGS. 13 and 14. These units are particularly useful in the production of liquid gas or in an air separation unit which separates air into its gaseous components. In both industries the liquefaction of gases is a crucial integer.

As illustrated in FIGS. 13 and 14 the drive unit can be used to liquefy gases. In the example illustrated in FIGS. 13 and 14 the gas to be liquefied is methane and the liquefaction process is carried out through two cycles both of which provide a mechanical output that can be used to generate electricity. In the first cycle the working gas is hydrogen and a schematic illustration of the cycle is shown in FIG. 13. Methane is fed to the heat exchanger 120 at atmospheric temperature namely 300° K. The nitrogen that is being passed through the heat exchanger enters the heat exchanger at a pressure of 7.1 bar and a temperature of 134° K after leaving the recovery turbine 60. The methane gas heats up the nitrogen to a temperature of 176° K at which time it is then fed to drive the main turbine 100. The heat exchanger causes the methane gas to be cooled from 300° K to 114° K. The methane gas at 114° K is then fed to the second part of the cycle shown in FIG. 14. In this cycle the working gas is neon, which has a much lower liquefaction temperature. In this cycle the exhaust from the recovery turbine 60 is at 7.1 bar at a temperature of 77° K, the temperature leaving the heat exchanger 120 and entering the turbine is at 114° K which means that the methane gas drops to 111° K and turns into liquid. Thus, the heat extracted from the methane gas drives a closed cycle assembly causing a generation of electricity at the alternator in each cycle and ultimately resulting in the methane gas being liquefied.

It is understood that liquefaction of the methane gas could also take place in a single cycle using the lower temperature liquefaction gas neon as the working gas. It is also understood that the system could be used to liquefy other gasses. In the first cycle shown in FIG. 13 the heat exchanger 120 operates as a heat exchanger but in the second cycle the heat exchanger effectively becomes a condenser, condensing the methane gas to liquid methane.

The efficiency of the unit provides a mechanism for liquefying a gas such as methane whilst at the same time generating electricity as a by-product.

Because the temperature differential is much larger than the waste heat cycle using dry air as the working medium (FIG. 11), it is best done using two independent cycles, one running on nitrogen, for the sensible heat extraction and another, using neon to extract the latent heat. It can be done using one unit with neon, but as it turns out nitrogen is a better working gas, plus, much more readily available than neon, but neon will go to a much lower temperature than nitrogen.

| Temperature (K) | Pressure (MPa) | Density (kg/m³) | Enthalpy (kJ/kg) | Entropy (kJ/kg-K) |
|---|---|---|---|---|
| 100.00 | 0.10000 | 3.4366 | 101.91 | 5.6937 |
| 176.19 | 0.71000 | 13.914 | 178.35 | 5.6937 |
| 134.78 | 0.71000 | 18.863 | 132.48 | 5.3965 |
| 175.00 | 0.71000 | 14.016 | 177.07 | 5.6864 |
| 99.100 | 0.10000 | 3.4697 | 100.94 | 5.6840 |

1) Cycle start—before compression
2) Normal compression enthalpy rise by 76.44
3) Compression, after recovery turbine. Enthalpy rise reduced to 30.567
4) Introduction of external heat. Temperature raised to 175
5) Expansion through the turbine. Temperature back down to 100 k for recompression.
6) Cycle complete—ready for compression The output of the unit is the output of the recovery turbine less efficiency losses or approximately 45 kj/kg×0.8=36

|   | Temperature (K) | Pressure (MPa) | Density (kg/m³) | Enthalpy (kJ/kg) | Entropy (kJ/kg-K) |
|---|---|---|---|---|---|
| 1) | 52.000 | 0.10000 | 4.7044 | 112.69 | 3.8794 |
| 2) | 114.02 | 0.71000 | 15.124 | 176.18 | 3.8794 |
| 3) | 77.967 | 0.71000 | 22.416 | 138.09 | 3.4775 |
| 4) | 114.00 | 0.71000 | 15.126 | 176.16 | 3.8792 |
| 5) | 51.990 | 0.10000 | 4.7054 | 112.68 | 3.8792 |

1) Cycle start—before compression
2) Normal compression, enthalpy rise by 63.49
3) Compression, after recovery turbine. Enthalpy rise reduced to 25.396
4) Introduction of external heat. Temperature raised to 114 k 5) Expansion through the turbine. Temperature back down to 52 k for recompression.
6) Cycle start, same as 1)

The output of the unit is the output of the recovery turbine less efficiency losses or approximately (38 kj/kg)×0.8=30.4 kj/kg This figure can be quoted in kw per kilogram as a constant output, for example if the unit were to use 10 kg/sec, the constant output would 10×30.4 or 304 kw.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A centrifugal compressor comprising a casing including an impeller having a gas intake and an outlet, the impeller having an input drive, and an impulse turbine rotor positioned around the periphery of the impeller adjacent the outlet, the impulse turbine rotor driving an output shaft, the impulse turbine rotor to be driven by high velocity gas exiting the impeller whereby the impeller has a plurality of radial impeller blades at a gas exit of the impeller configured to maintain the high velocity of the gas exiting the impeller blades, wherein the pressure of the gas entering the impulse turbine rotor is maintained at an exit of the impulse turbine rotor and a stator is positioned between the exit of the impeller and the impulse turbine rotor that redirects exiting gases to the impulse turbine rotor.

2. The centrifugal compressor according to claim 1 wherein a gearbox is interposed between the output shaft of the impulse turbine rotor and the input drive of the impeller.

3. The centrifugal compressor according to claim 2 wherein the output shaft is coupled to a double planetary gear box that drives the impeller.

4. An electricity generating power plant having a closed cycle drive unit comprising a steam turbine having an output shaft, an externally heated heat exchanger, and the centrifugal compressor of claim 1, wherein an exhaust of the steam turbine is fed into the gas intake of the centrifugal compressor, and wherein the exhaust of the impulse turbine rotor passes through the heat exchanger to drive the steam turbine, the output shaft of the steam turbine and an output shaft of the impulse turbine rotor being coupled to a gearbox to drive the centrifugal compressor and an alternator to generate electricity.

5. The centrifugal compressor according to claim 1 wherein the output shaft driven by the impulse turbine rotor assists the input drive of the impeller.

6. A closed cycle drive unit comprising the centrifugal compressor of claim 1, a heat exchanger and a drive turbine having an output shaft coupled to the input drive of the impeller of the centrifugal compressor, wherein the exiting gases of the impulse turbine rotor pass through a heat exchanger and are fed into the drive turbine to drive the drive turbine, and an exhaust of the drive turbine is fed to the gas intake of the centrifugal compressor.

7. A closed cycle drive unit comprising: a drive turbine, a centrifugal compressor comprising an impeller located within a casing inlet having a gas intake and an outlet, the impeller having an input drive, and an impulse turbine rotor positioned around the periphery of the impeller adjacent the outlet, the impulse turbine rotor having an output shaft coupled to the input drive of the impeller, the impulse turbine rotor being driven by high velocity gas exiting the impeller whereby the impeller has a plurality of radial impeller blades at a gas exit of the impeller thereby maintaining the high velocity gas exiting the impeller blades wherein the pressure of the gas entering the impulse turbine rotor is maintained at an exit of the impulse turbine rotor, and a stator positioned between the exit of the impeller and the impulse turbine rotor redirects exiting gases to the impulse turbine rotor, the drive turbine having a gas inlet and a gas outlet and a drive turbine output shaft wherein the exhaust gas of the impulse turbine rotor passes through a heat exchanger to be fed to the gas inlet of the drive turbine, the gas outlet of the drive turbine being coupled to the gas intake of the centrifugal compressor and the drive turbine output shaft coupled to the input drive of the impeller of the centrifugal compressor.

8. A gas liquefaction plant comprising the closed cycle drive unit of claim 7, a working gas of the closed cycle drive unit and a gas to be liquefied by the heat exchanger by cooling into liquid form; wherein the working gas has a liquefaction temperature that is lower than a liquefaction temperature of the gas to be liquefied.

9. The gas liquefaction plant according to claim 8 wherein the working gas is neon and the gas to be liquefied is methane.

10. An electricity generating power plant comprising the closed cycle drive unit of claim 7 and one of an alternator and a generator, wherein the output shaft of the drive turbine drives the one of the alternator and the generator.

11. The electricity generating power plant of claim 10, further comprising a gearbox, wherein the drive turbine output shaft, the output shaft of the impulse turbine rotor and the input drive of the impeller are all coupled to the one of the alternator and generator through the gearbox.

12. A centrifugal compressor comprising a casing including an impeller having a gas intake and an outlet, the impeller having an input drive, and an impulse turbine rotor positioned around the periphery of the impeller adjacent the outlet, the impulse turbine rotor driving an output shaft, the impulse turbine rotor to be driven by high velocity gas exiting the impeller whereby the impeller has a plurality of radial impeller blades at a gas exit of the impeller configured to maintain the high velocity of the gas exiting the impeller blades, wherein the pressure of the gas entering the impulse turbine rotor is maintained at an exit of the impulse turbine rotor and a stator is positioned between the exit of the impeller and the impulse turbine rotor that redirects exiting gases to the impulse turbine rotor.

13. A closed cycle drive unit comprising: a drive turbine, a centrifugal compressor comprising an impeller located within a casing inlet having a gas intake and an outlet, the impeller having an input drive and an impulse turbine rotor positioned around the periphery of the impeller adjacent the outlet, the impulse turbine rotor having an output shaft coupled to the input drive of the impeller, the impulse turbine rotor being driven by high velocity gas exiting the impeller whereby the impeller has a plurality of radial impeller blades at a gas exit of the impeller thereby maintaining the high velocity gas exiting the impeller blades wherein the pressure of the gas entering the impulse turbine rotor is maintained at an exit of the impulse turbine rotor, and a stator positioned between the exit of the impeller and the impulse turbine rotor redirects exiting gases to the impulse turbine rotor, the drive turbine having a gas inlet and a gas outlet and a drive turbine output shaft wherein the exhaust gas of the impulse turbine rotor passes through a heat exchanger to be fed to the gas inlet of the drive turbine, the gas outlet of the drive turbine being coupled to the gas intake of the centrifugal compressor and the drive turbine output shaft coupled to the input drive of the impeller of the centrifugal compressor.

* * * * *